United States Patent Office 3,353,246
Patented Nov. 21, 1967

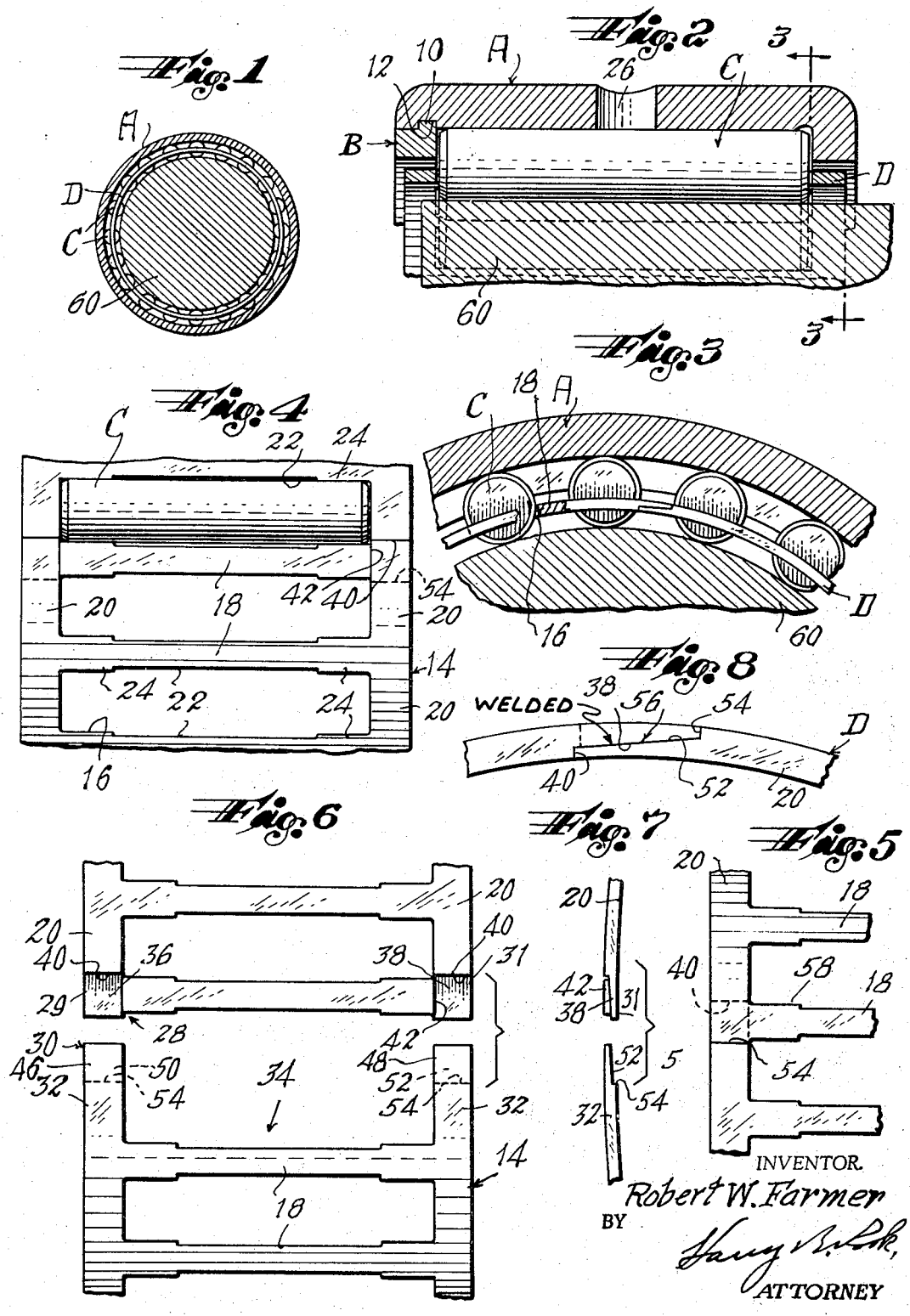

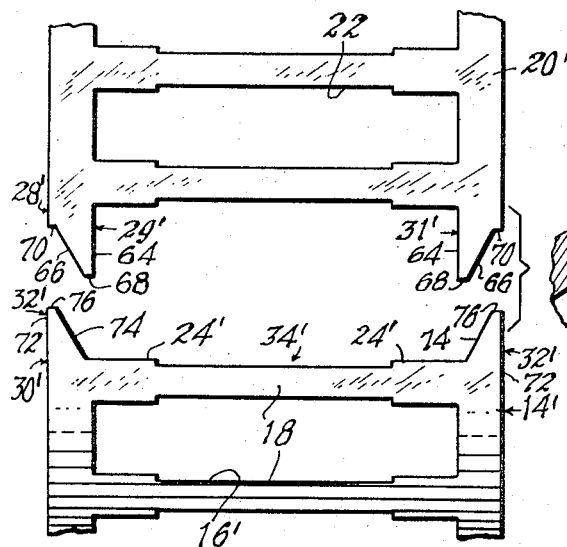
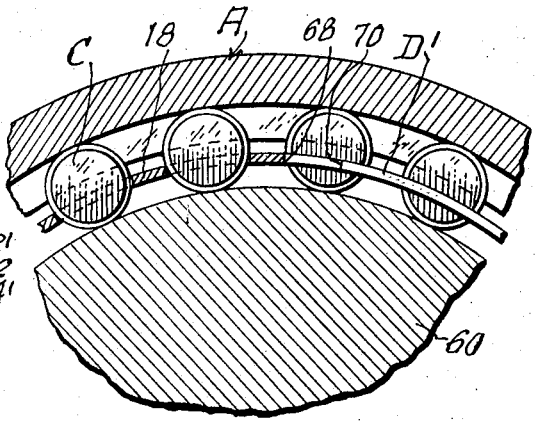
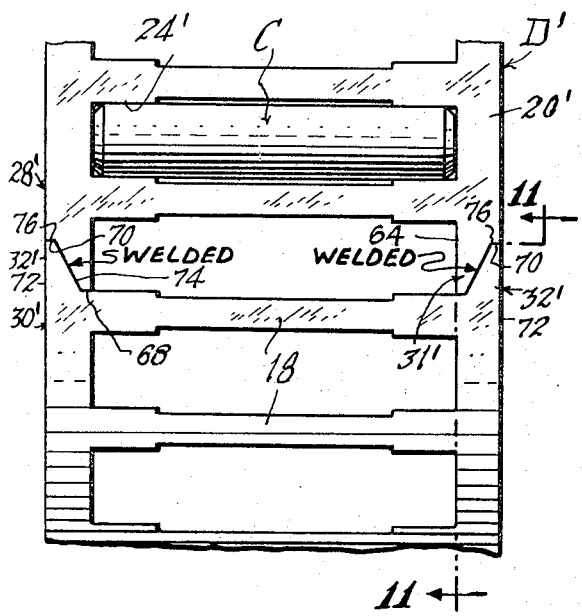
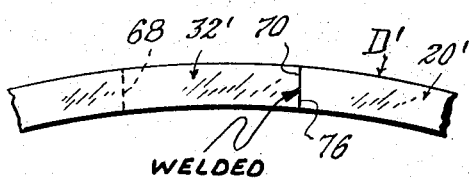

3,353,246
METHOD OF MAKING A CAGE FOR
A ROLLER BEARING
Robert W. Farmer, Livingston, N.J., assignor to Orange Roller Bearing Company, Inc., a corporation of New York
Filed July 1, 1965, Ser. No. 468,778
3 Claims. (Cl. 29—148.4)

ABSTRACT OF THE DISCLOSURE

A flat strip of metal that has a thickness less than the diameter of the rollers to be held by the cage and whose opposite faces are parallel to each other, has a longitudinal row of slots punched therein portions of the side walls of each of which are spaced apart a distance less than the diameter of such rollers, and the ends of the side portions of the strip beyond the ends of the slots are swaged in opposite faces thereof to form lap joint surfaces with shoulders at their inner ends, the punched strip being bent into a circular ring with the joint surfaces in overlapped relation and said shoulders at one end of the strip abutting the other ends of said side portions of the strip, the overlapped surfaces being welded together.

---

This invention relates specifically to roller bearings of the types which includes an outer race ring, or a race ring having an interior race, a plurality of rollers within the race ring, and a holder or cage for the rollers.

An important object of the present invention is to provide a novel method of making a cage for rollers from a preformed rectangular flat strip of metal having a series of slots or pockets for the rollers formed by spaced parallel ribs or cross pieces connecting side portions of the strip, said method including the steps of swaging, overlapping and welding the ends of the side portions of the strip with the strip in circular formation thereby forming joints of great tensile strength and thereby forming a pocket or slot for a roller between the ends of the strip of the same construction and dimensions as the other pockets or slots of the cage.

Another object of the invention is to provide a novel method of making a joint for the ends of such a strip of metal in forming such a cage for rollers including the steps of swaging the ends of the side portions of the strip to form complementary inclined or slanted surfaces with shoulders, sliding the surfaces on each other into abutment with the shoulders, and welding the inclined surfaces to each other.

Other objects, advantages and results of the invention will appear from the following description in conjunction with the accompanying drawings in which, FIGURE 1 is a cross-sectional view of a metal shaft with a roller bearing embodying a cage made in accordance with the present invention applied thereto.

FIGURE 2 is a fragmentary vertical sectional view showing a pocket of the cage with a roller therein.

FIGURE 3 is a vertical sectional view taken on the line 3—3 of FIGURE 2.

FIGURE 4 is a plan view of a fragment of a preformed metal strip from which the cage is made, showing a roller in position and showing the end joints of the side walls of the cage.

FIGURE 5 is a fragmentary plan view of the welded joint of one of the side walls of the cage, the joint opposite to the joint shown in FIGURE 3.

FIGURE 6 is a view similar to FIGURE 4 but showing the ends of the strip disjointed.

FIGURE 7 is an end view looking from the right of FIGURE 6.

FIGURE 8 is a view similar to FIGURE 7 but showing the ends joined.

FIGURE 9 is a plan view of a fragment of a preformed metal strip from which a modified form of roller cage is made, showing the ends disjointed.

FIGURE 10 is a similar view showing the ends of the cage joined and showing a roller in position.

FIGURE 11 is a fragmentary sectional view taken on the line 11—11 of FIGURE 10 and looking in the direction of the arrows and showing the cage in operative position as in FIGURE 3.

FIGURE 12 is a view similar to FIGURE 8 of the modified form of roller cage.

For the purpose of illustrating the invention, I have shown it in conjunction with the generally known type of roller bearing which includes an outer race ring A having retainer rings B at its ends to hold the rollers C against axial alignment with respect to the race ring. As shown at least one of these retainer rings B is separate from the race ring A and is interlocked with the race ring by a flange 10 and groove 12 connection.

The roller cage D is formed of a strip 14 of suitable material of such length that when it is bent into circular form, the cage D will loosely fit within the inner race of the race ring A. The strip 14 is of a thickness less than the diameter of the rollers C and its opposite faces are flat and parallel to each other. The strip is stamped with a plurality of transverse slots 16, providing crosspieces or ribs 18 and side portions or walls 20 which connect the ribs and form the ends of the slots. The cross ribs and side walls define the slots or pockets 16. The cross ribs 18 constitute roller spacing elements and their central portions are preferably cutaway as indicated at 22 to provide clearance for a lubricant and to provide projections 24 at their ends for slight contact with the rollers C. The distance between opposed projections of each pocket is less than the roller diameter. A hole 26 is shown in the outer race ring A for lubricating the rollers.

The ribs 18 and slots 16 are spaced equidistantly along the strip extending from one end thereof such as the end 28 at which one rib 18 is located as seen in FIGURE 6. At the other end 30 of the strip however the side portions or walls 20 are extended as indicated at 32 leaving an open space 34 wider than the width of the slots 16. In accordance with the present invention, the ends 29 and 31 of side walls 20, 20 at the end 28 of the strip are swaged to form joint surfaces 36 and 38 on one side thereof; preferably, but not necessarily inclining or slanting outwardly toward the end edges thereof, forming inner shoulders 40, 40 on the side walls and lateral shoulders 42, 42 on the ends of the adjacent rib 18. The other ends 46 and 48 of the side walls 20, 20 at the end 30 of the strip are swaged to form joint surfaces 50 and 52 on the opposite sides thereof that preferably but not necessarily slant or incline outwardly toward the end edges thereof, forming shoulders 54, 54.

The preformed strip is bent around a mandrel into circular form and the ends 29 and 31 of the side walls are secured to the ends 46 and 48 of the side walls. This securement is accomplished by sliding the ends 46 and 48 of the side walls over the ends 29 and 31 thereof, respectively, along the end shoulders 42, 42 on the adjacent rib 18 until the end edges of ends 46 and 48 abut the inner shoulders 40, 40 on the ends 29 and 31 of the side walls 20. The ends 29, 31, 46 and 48 are thus properly positioned for welding the overlapped surfaces to each other and to the shoulders as indicated at 56. The extensions 32, 32 and the slanting surfaces are so dimensioned lengthwise, and the shoulders are so located that in forming the joints between the ends of the side walls, the parts automatically assume positions whereby the slot or pocket 58 defined by the joined side walls and ribs 18 is of the same dimensions and construction as the other slots or pockets of the cage.

In assembling the cage ring D and rollers C into the race ring A, the rollers are set into the slot or pockets 16 and 58 from the outer circumference of the cage ring D and temporarily held in position by a suitable fixture (not shown) whereupon the cage ring D is slipped coaxially into the race ring A at the end thereof, in which the removable retainer ring is to be fitted, the fixture being removed as the cage ring D enters the race ring A. Then the removable retainer ring B is inserted so as to hold the cage ring D and rollers C against axial displacement from the race ring A.

With this construction, the resulting welds afford greater tensile strength than the conventional square, butted joints. It will be observed that the rollers C will be held against displacement radially inwardly of the race ring A free for contact with the inner surface of the race ring A beyond the outer circumference of the cage ring D and free for contact with a shaft 60 inside the inner circumference of the cage ring D. The rollers C are loosely held in place in the slots 16 and the cage ring D in effect floats during operation of the bearing so as to hold the rollers C in properly spaced relation and with their axes parallel to the axis of the race ring A. The ends of the slots serve as stops to limit longitudinal movement of the cage ring D while the retainer rings B limit movement of the rollers C axially of the bearing.

Referring now to the modified form of roller cage D' shown in FIGURES 9 to 12, inclusive, this form of cage D' differs from the cage D of FIGURE 1 merely in the construction of the one end 28' and in the construction of the other end 30' of the strip 14', and in the method of joining such ends. In cage D', the walls 20' at the sides of the strip at both ends 28' and 30' are formed with substantially right angle triangular shaped extensions 29' and 31' and 32' and 32', respectively. The extensions when not joined as seen in FIGURE 9 provide a space 34' between the ends 28' and 30' wider than the width of the slots 16'. The extensions 29' and 31' at the end 28', each has a straight inner vertical edge 64 on the inner edge of the side wall 20' and a downwardly and inwardly slanting outer edge 66, the straight edges 64 and the slanting edges 66 defining horizontal short end edges 68. The slanting outer edges 66 of the extensions and the outer straight edges of the side walls 20' define horizontal shoulders 70.

The extensions 32', 32' of the other end 30' of the strip 14', each has a substantially right-angle triangular shaped body with a straight outer edge 72 and a downwardly and inwardly extending slanting inner edge 74 as viewed in FIGURE 9. The outer straight edges 72 and the inner slanting edges 74 define straight short horizontal edges 76 at the tops of the extensions 32' as viewed in FIGURE 9. The slanting edges 66 and 74 and the shoulders 70 and top straight end edges 76 are adapted to abut against each other and the bottom straight end edges 68 are adapted to abut against the edges of the projections 24' adjacent the extensions 32', 32' when brought together as seen in FIGURE 10. The abutting slanting edges, shoulders and end edges are preferably welded to each other as indicated by the words "welded" in FIGURES 10 and 12.

It will thus be seen that my invention provides a cage with joints that have greater tensile strength than the conventional square, butted joints; that is simple and inexpensive and which will permanently hold rollers in the outer race ring, and restrain the rollers against cocking or misalignment with respect to the race ring.

While I have shown now preferred embodiments of my invention, it should be understood that further modifications and changes may be made in the details of construction and use of the invention without departing from the spirit or scope thereof.

Having thus described my invention what I claim is:

1. The method of making a cage for the rollers of a roller bearing, which consists of punching a strip of bendable sheet material to form a longitudinal row of elongated roller-receiving slots between the side portions of the strip each of which extends transversely of the strip and portions of whose side walls are parallel to each other throughout the thickness of the strip and spaced apart a distance less than the diameter of the rollers to be held in the cage, swaging the ends of the side portions of the strip forming thereon slanted joint surfaces having shoulders at their inner ends with the shoulders at one end of the strip to abut the opposite end of the strip, bending the strip into a circular ring, overlapping said joint surfaces and securing together the overlapped ends of the strip with the shoulders at one end of the strip abutting the other ends of said side portions of the strip.

2. The method of making a cage for the rollers of a roller bearing as defined in claim 1 wherein the ends of the side portions of the strip are swaged in the opposite faces of the strip.

3. The method of making a cage for the rollers of a roller bearing as defined in claim 1 wherein the ends of the side portions of the strip beyond the ends of the slots are formed with complemental right angle triangular extensions having oppositely facing joint surfaces and the strip is bent into a circular ring with said surfaces in abutting relation and welded together.

References Cited

UNITED STATES PATENTS

| 810,007 | 1/1906 | Ward | 72—332 |
|---|---|---|---|
| 2,294,289 | 8/1942 | Frauenthal | 29—148.4 |
| 2,591,160 | 4/1952 | Kilian | 29—148.4 |
| 3,042,993 | 7/1962 | Schondelmaier | 29—417 X |

FOREIGN PATENTS

| 1,256,501 | 2/1961 | France. |
|---|---|---|

THOMAS H. EAGER, *Primary Examiner.*